Feb. 14, 1939.　　　　　M. HOCHSTADTER　　　　　2,147,096
ARMOR FOR SHEATHS OF ELECTRIC CABLES
Filed Dec. 31, 1935

Inventor:
M. Hochstadter
By:
Glascock Downing & Seebold
Attorneys

Patented Feb. 14, 1939

2,147,096

UNITED STATES PATENT OFFICE 2,147,096

ARMOR FOR SHEATHS OF ELECTRIC CABLES

Martin Hochstadter, Brussels, Belgium, assignor to Protona A. G., Therwil Baselland, Switzerland Application December 31, 1935, Serial No. 57,041
In Germany February 5, 1934

7 Claims. (Cl. 173—266)

Leakages in lead sheaths of electric cables existing either as the result of the process of manufacture or of some occurrence while the cable is in operation often causes disturbances. The reasons for such lead sheath defects are numerous and are often due to impurities in the lead, more especially when the lead sheath is manufactured in a lead press which produces welded seams in the lead and the impurities are in the proximity of the welded seams. Lead sheath defects are especially detrimental in the case of cables filled with thin oil, so-called oil-filled cables, and in the case of cables which are under pressure during operation, so-called pressure cables, because in these cases, the defect results in immediate escape of oil or pressure gas.

Such lead sheath faults occur especially when the lead sheath is not provided with any mechanical reinforcement, or only with such mechanical reinforcement, which is not reliably effective at all points.

Since, as is well-known, lead possesses only very slight elastic properties, almost all the alterations of shape, produced during the operation of the cable, are of a permanent character, and therefore if a reliable support is not available at all points, such permanent alterations of shape, even when small, and more especially when of a cumulative character, may lead to a local bursting of the lead.

This phenomenon is, as already stated, of special importance in the case of cables which are under pressure, it being immaterial whether the pressure medium is inside or outside the lead sheath.

In the case of internal pressure, the lead sheath must be provided with a sufficiently strong mechanical reinforcement, in order to resist the inner pressure, and, in the case of external pressure, the lead sheath, together with the adjacent paper insulation, if used, is easily crumpled, viz. formed with folds, if a cumulative change in the shape of the lead is not prevented. All these conditions are well known to workers in the art.

It is already known to armor the lead sheath of cables as a protection against internal pressure. These armorings consist, almost always, of one or more metal bands which, when more than one band is employed, are wound around the cable in the same direction, or in opposite directions to one another. Usually, such bands are of substantial thickness, for instance, 1 mm. thick, and they are made of iron or some other metal. Generally one or two layers of thin asphalted paper is or are provided directly on the lead sheath and asphalted jute is placed over the metal bands, the metal bands themselves being also asphalted. It has been found, however, that such an armoring does not avoid faults in the lead sheath above referred to. This is probably due to the fact that the rather stiff metal bands cannot be arranged, during the manufacture, so that they lie uniformly at all points against the cable sheath, and that this drawback is further increased by the fact that subsequently, while the cable is being transported and laid, a loosening (untwisting) of the armoring bands often occurs locally. Further, with the object of increasing the heat stability of paper insulated and oil impregnated cables, it has been proposed to make the armoring of one metal band only, which is placed directly and so firmly against the lead sheath that, after each heat cycle of the cable, it presses the lead sheath elastically back into exactly the original position tight on the insulation. However, it has not so far been found how this is to be attained in practice by means of metal bands, nor how a firm abutment of such a metal band against the lead sheath can be permanently ensured. For this reason it has also been proposed to modify this elastic armoring by replacing the metal bands by a paper winding. However, such paper winding does not possess the desired mechanical strength and permanency of shape; it easily forms, as is well-known, longitudinal and transverse folds, whereby the result desired for this and other purposes, is not attained.

It is also known to insert between an inner and an outer lead sheath a binding tape of non-magnetic material to strengthen the cable, for example when it is bent, and also reinforce the inner lead sheath so as to prevent it from being stretched as a result of the internal oil pressure, a layer of paper being interposed between the inner lead sheath and the binding tape of non-magnetic material, to form a yielding bed for the latter, and a thin paper covering around the binding tape, to form a bed for the outer lead sheath.

The present invention refers to an especially effective armoring for the lead sheaths of electric cables, the object being the avoidance of the disadvantages above referred to. Since it is especially suitable for cables in which the lead sheath is subjected to an internal pressure, the invention will be described with reference to such a cable, it being understood, however, that it can be similarly applied to other constructions.

The invention consists in an armoring for lead sheaths of electric cables, more particularly of such cables which are under pressure, and its characteristic feature is that a metal tape is used in conjunction with a tubular body consisting of a multi-layer paper tape winding provided thereon, the two forming an integral armoring which is firmly applied on the lead sheath, the relative thicknesses of the metal tape and multi-layer paper tape winding thereon being such that the multi-layer paper tape winding keeps the metal tape firmly pressed and prevents its being untwisted, while the metal tape prevents folds being formed in the paper winding so that an armoring is produced which supports the lead sheath firmly at every point.

In the accompanying drawing wherein several approved embodiments of the invention are illustrated:

Figure 1:
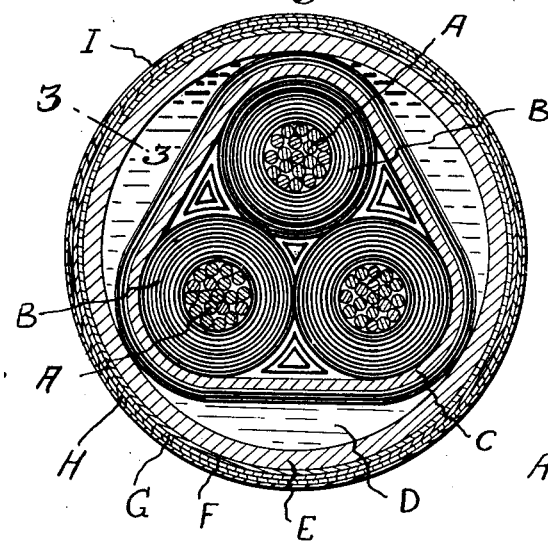
Figures 1 and 2 are transverse sectional views of two different forms of cables, illustrating the invention applied thereto.
Figure 2:
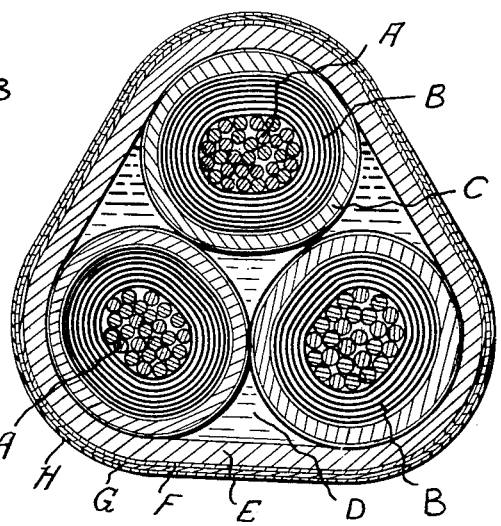
Figure 3:
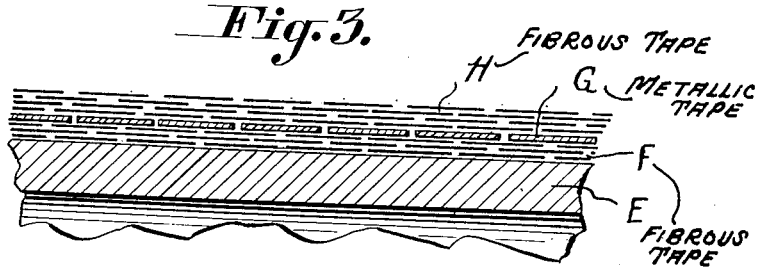
Fig. 3 is a fragmentary longitudinally sectional view through the lead sheath of the cable illustrated in Figs. 1 and 2 showing the approved armor applied thereto. In this figure as well as in Figs. 4 and 5, the non-metallic tapes are shown in single lines and the metallic tapes in double lines in order that the respective tapes may be readily distinguished.

Referring to the drawing in detail, corresponding reference characters designate like parts in Figs. 1 to 3, Fig. 1 showing the invention applied to a lead sheath of circular form, and Fig. 2 showing the invention applied to a lead sheath of non-circular form. In each of these three figures, A designates the copper conductors and B the insulation surrounding the conductor cores. According to Fig. 1, the three cores constituting the cable are enclosed in a single sheath C while in Fig. 2, the individual cores are separately enclosed in sheaths C'. In both forms, however, the sheaths C and C' are enclosed in the outer protecting sheath E, spaces D being provided between the outer sheath E and the sheaths C and C' which are adapted to be filled with a suitable medium under pressure.

The protective sheath E is protected against bursting due to internal pressure by the improved armoring according to the invention which consists of a metal tape G embedded between two non-metallic bodies F and H constituted by tapes made of paper, fiber, synthetic cellulose compounds, woven fabrics, felt or other non-metallic materials, the several tapes G, F and H being firmly wound in this relative arrangement on the protective sheath E of the cable. The whole structure is finished by a covering I of suitable type, as for instance, Hessian tape.

The characteristic feature of the invention consists in that the metallic tape G is used in conjunction with the tubular body H consisting of a multi-layer paper tape winding thereon, the paper tapes being solidly wound on top of one another and preferably in reverse direction and the two forming an integral armoring which is firmly applied to the lead sheath. The relative thickness of the metal tape and the multi-layer paper winding thereon is such that the paper winding keeps the metal tape firmly pressed and prevents its being untwisted, while the metal tape prevents folds being formed in the paper winding so that an armoring is produced which supports the lead sheath firmly at every point.

By means of an armoring produced in this way from metal tapes intercalated with paper tapes or tapes of other non-metallic material, an improved result is secured which cannot be obtained by either the one or the other material when used singly.

Every winding of metal tape G by itself, and likewise every non-metallic tape F or H may be wound in either an abutting or an overlapping manner, as is well-known, and the superposed windings may similarly overlap one another. Before the tapes are applied, they may be coated or impregnated individually with asphalt, lacquer, or like substances, or after the armoring has been obtained, it may be impregnated as a whole body with suitable materials. Also the lead sheath E itself, before the armoring is applied thereto, may be treated in the same way, for instance, it may be coated with asphalt, or otherwise. The metal tapes may be solid or perforated, composed of wires, wire mesh or otherwise.

The armoring may be applied to the lead sheath E in different ways. For instance, first of all a paper or like non-metallic tape winding F of one or more layers may be provided over the lead sheath, and the metal tape winding G is applied thereon followed by a multi-layer tape winding H of paper or like material. Preferably, the outer paper tape winding H is wound in a reverse direction to the inner one. In order to render the armoring as uniform and firm as possible, the paper tapes F and H and the metal tape G are preferably applied in one operation. The individual parts of this armoring may either be used in a dry state, or, they may be impregnated with asphalt or other material, before they are applied. Moreover, the whole of the armoring may be impregnated, after it has been completed.

In order to attain the result aimed at by the invention, it is especially important that the thickness of the metal tape or tapes G and their rigidity be such that the metal tape is firmly embedded in the paper winding as an integral part thereof. Preferably, the metal tapes have, for instance, a thickness of 0.2 mm. up to 0.3 mm., according to the material, and such tapes are used in conjunction with paper tapes of usual thickness of, for instance, 0.12 mm. up to 0.2 mm.

Figure 4:
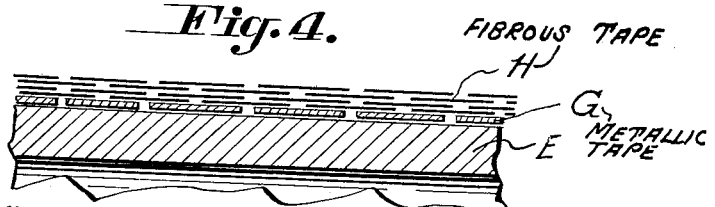
Figs. 4 and 5 are similar longitudinal sectional views of modifications of the invention.
Figure 6:
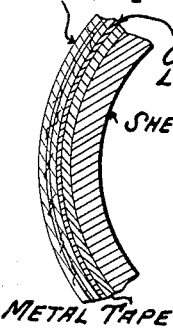
Fig. 6 is a transverse fragmentary sectional view of the cable according to one form of the invention.

Further, the inner paper winding may, under circumstances, be dispensed with, or it may be replaced by a winding of another material or by an asphalting of the lead sheath as shown in Fig. 4.

Figure 5:
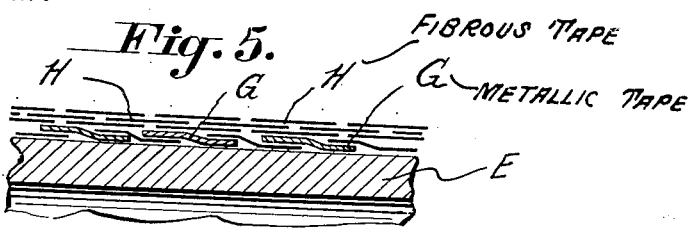

According to another practical form, the metal tape is wound together with a paper tape, in such a manner that the two tapes of different material overlap each other as shown in Fig. 5.

The object of the invention, of producing an especially effective armoring for lead sheaths which are under internal pressure, may further be assisted by inserting in the armoring, according to the invention, one or more gastight layers, in order to prevent, or limit as much as possible, a loss in pressure gas, should there be a leakage in the lead sheath. Such a gastight layer may be obtained in different ways; for instance by the provision of oil impregnated linen, caoutchouc, cellulose derivatives, either in the form of a tape or as a lacquer coating. Naturally, all the known means may be employed for the purpose of rendering such a layer gastight.

While in the foregoing specification the pressure resistant armor has been described with reference to use on lead sheathed cables, it will be apparent to those skilled in the art that the invention is not so restricted but is applicable to other sheaths.

What I claim is:

1. A pressure-resistant armor for sheathed electric cables suitable for resisting rupture of the cable sheath without an outer metallic covering, said armor comprising a multiple layer laminated covering firmly applied to the cable sheath and composed predominantly of fibrous tape wrapping and a thin metal tape wrapping adjacent the cable sheath and embedded in the multiple layer fibrous tape wrapping, the metal tape wrapping, in itself, being insufficient to reinforce the cable sheath under normal working pressures and being of a thickness substantially less than the outer multiple layer fibrous tape wrapping so that the latter maintains the metal tape wrapping firmly pressed and prevents untwisting, and the metal tape serves to prevent the formation of folds in the fibrous tape wrapping.

2. A pressure-resistant armor for sheathed electric cables comprising a compact multiple layer covering firmly applied to the sheath, said covering being formed of metallic thin tape wrapping embedded in a multiple-layer fibrous tape wrapping, the thickness of the metal tape wrapper being substantially less than 1 mm. thickness so that the fibrous wrapping maintains the metal tape wrapping firmly pressed and prevents untwisting, the metal tape serving to prevent formation of folds in the fibrous wrapping and the two wrappings jointly having sufficient strength to reinforce the cable sheath.

3. A pressure-resistant armor for sheathed electric cables comprising a compact multiple layer covering firmly applied to the sheath, said covering being formed of metallic thin tape wrapping embedded in a multiple-layer paper tape wrapping, the thickness of the metal tape wrapper being substantially less than 1 mm. thickness so that the paper tape wrapping maintains the metal tape wrapping firmly pressed and prevents untwisting, the metal tape serving to prevent formation of folds in the paper wrapping and the two wrappings jointly having sufficient strength to reinforce the cable sheath and a gas tight layer inserted in said armor.

4. A pressure-resistant armor for sheathed electric cables comprising a compact multiple layer covering firmly applied to the sheath, said covering being formed of metallic thin tape wrapping embedded in a multiple-layer paper tape wrapping wound in opposite directions, the thickness of the metal tape being substantially less than the multiple layer paper tape wrapping and substantially less than 1 mm. thickness, so that the paper wrapping maintains the metal tape wrapping firmly pressed and prevents untwisting, the metal tape serving to prevent formation of folds in the paper wrapping and the two wrappings jointly having sufficient strength to reinforce the cable sheath.

5. A pressure-resistant armor for sheathed electric cables comprising a compact multiple layer covering firmly applied to the sheath, said covering being formed of metallic thin tape wrapping embedded in a multiple-layer paper tape wrapping, the thickness of the metal tape wrapper being substantially less than the multiple layer paper tape wrapping and of the order of 0.2–0.3 mm. thickness, so that the paper wrapping maintains the metal tape wrapping firmly pressed and prevents untwisting, the metal tape serving to prevent formation of folds in the paper wrapping and the two wrappings jointly having sufficient strength to reinforce the cable sheath.

6. A pressure-resistant armor for sheathed electric cables, as defined in claim 1 characterized in that a bitumen impregnated multiple layer non-metallic fibrous tape wrapping is inserted between the cable sheath and the metal tape wrapping.

7. A pressure-resistant armor for sheathed electric cables as defined in claim 1 characterized in that the metal tape wrapping is adhesively applied directly to the cable sheath.

MARTIN HOCHSTADTER.